April 22, 1924.
A. H. STEBBINS
1,491,433
DUST EXTRACTOR
Filed July 10 1922 2 Sheets-Sheet 1
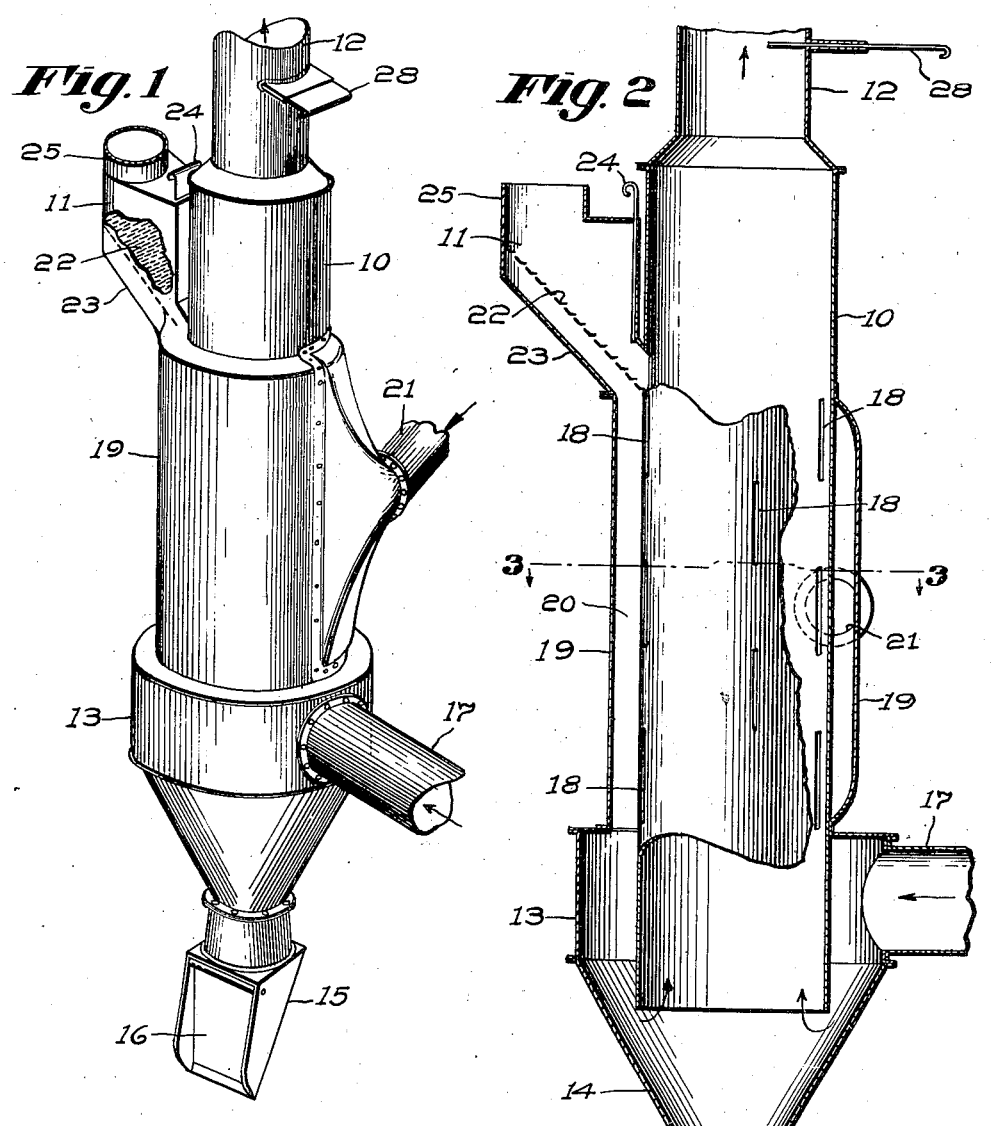
INVENTOR
Albert H. Stebbins
BY Robt. P. Harris
ATTORNEY Patented Apr. 22, 1924.

1,491,433

UNITED STATES PATENT OFFICE.

ALBERT H. STEBBINS, OF LOS ANGELES, CALIFORNIA.

DUST EXTRACTOR.

Application filed July 10, 1922. Serial No. 573,835.

*To all whom it may concern:*

Be it known that I, ALBERT H. STEBBINS, a citizen of the United States, residing at Los Angeles, in the county of Los Angeles and State of California, have invented an Improvement in Dust Extractors, of which the following description, in connection with the accompanying drawings, is a specification, like characters on the drawings representing like parts.

This invention relates to dust extractors for removing dust and fine particles from the materials treated.

It is frequently desirable to remove dust and fine particles from materials that are in a comparatively fine condition by passing air through the materials, and it is important that the materials being treated be thoroughly exposed to the action of the dust removing air that the dust may be completely removed.

The principal feature of the present invention, therefore, resides in a drum or casing into which materials are delivered to be acted upon by air rising therein, and in which thorough action of the air upon the materials within the drum is secured by introducing jets of air through the wall of the drum at various points.

Another feature of the invention resides in a jacket that surrounds the drum in which the materials are treated, and which serves to supply air to the apertures in the wall of the drum so that air may be forced inwardly through these apertures.

Another feature of the invention resides in a feed hopper having means for forcing air through the materials therein to promote feeding of the materials therefrom.

Other features of the invention and novel combination of parts in addition to the above will be hereinafter described in connection with the accompanying drawings which illustrate one good practical form thereof.

In the drawings:

Fig. 1 is a perspective view of a dust extractor constructed in accordance with the present invention;

Fig. 2 is an enlarged vertical sectional view through the device of Fig. 1;

Fig. 3 is a sectional view taken on the line 3—3 of Fig. 2; and

Figure 4:
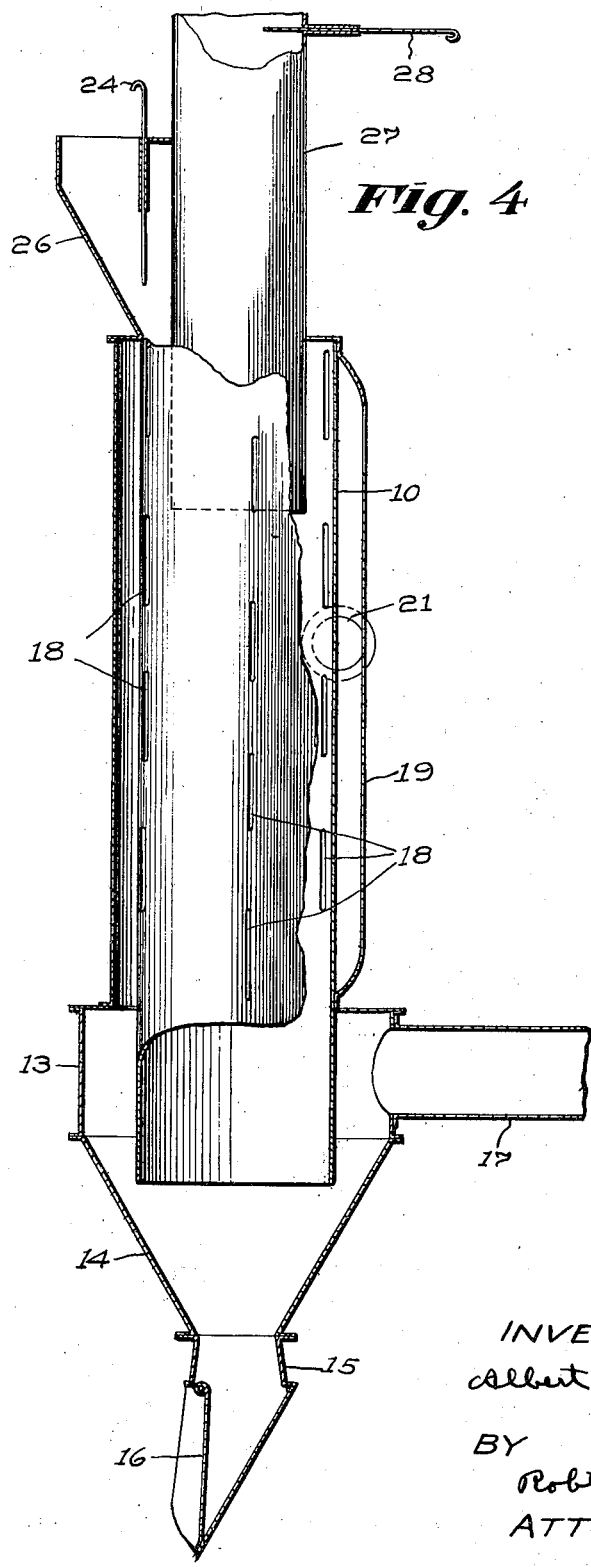
Fig. 4 is a vertical sectional view through a modification of the invention.

In the construction shown in Figs. 1, 2 and 3, the dust extractor is provided with a tubular drum or casing 10, and the materials to be treated may be delivered into the upper part of the drum 10 by a feed hopper 11.

The materials delivered into the drum 10 are subjected to the action of air rising therein, and to obtain a flow of air upwardly through the drum 10 a conduit 12 is provided that leads from the upper end of the drum, and air enters the lower end of the drum from a casing 13 into which the lower end of the drum extends. The lower portion of the casing 13 preferably is cone-shaped as indicated by 14 and the materials that collect in the casing may be discharged therefrom through a spout 15 closed by a swing door 16 that permits the materials to escape but prevents air from entering the casing through the spout.

Air enters the casing 13 at a point above the lower end of the drum 10 through a conduit 17, and as a result of this construction the air that is supplied by the conduit 17 may pass entirely around the lower portion of the drum 10 and enter the lower end of the drum from all sides thereof. The upward flow of air through the drum 10 may be produced by connecting the conduit 12 with suction means, or by blowing air inwardly through the conduit 17.

In accordance with the present invention, jets of air are delivered into the drum 10 through the wall thereof at various points to strike the materials therein and subject all portions of these materials to the action of the rising air. In the construction shown, the drum 10 has apertures or slots 18 formed through the wall thereof about the drum and lengthwise thereof, and the portion of the drum in which the apertures 18 are formed is surrounded by a jacket 19 that forms an annular air chamber 20 between the drum and jacket. Air is delivered tangentially into this annular chamber by a pipe 21 so that the air will whirl around the chamber 20, and the apertures 18 have the opposite lips thereof positioned to direct the air traveling within the chamber 20 into the drum 10 to whirl therein in the direction indicated by the arrows in Fig. 3.

As a result of the construction described, the materials to be treated are delivered by the hopper 11 into the drum 10 and are subjected to the air rising therein, but the rising air currents alone may not act upon the materials sufficiently to remove the dust completely. The apertures 18 are therefore provided through which jets of air are directed into the drum to impart a whirling movement to the air therein. These jets of air strike the materials moving downwardly within the drum and deflect the dust and lighter materials inwardly toward the center of the drum to be carried upwardly by the rising air current, while the heavier particles are thrown outwardly by centrifugal force against the wall of the drum and move downwardly into the tapered portion of the casing 13.

In some cases it may be desirable to force air through the materials in the hopper 11 to promote feeding of the materials to the drum, and in Figs. 1 and 2 the hopper 11 is shown as having an inclined perforated surface 22 upon which the materials rest, and a casing 23 below this surface and extending upwardly from the jacket 19 serves to direct air through the apertures of the surface 22 and the materials resting upon this surface in a direction to promote feeding of the materials. The rate at which the materials are delivered from the hopper 11 to the drum 10 may be controlled by a sliding gate 24, and materials may be delivered into the hopper 11 by a feed pipe 25.

The dust extractor of Fig. 4, for the most part, is similar in construction and operation to the dust extractor of Figs. 1 and 2, but in Fig. 4 materials are fed to the drum 10 by a hopper 26 having no provision for directing air through the materials within the hopper, and in Fig. 4 the conduit 27 extends into the drum 10 some distance below the delivery end of the hopper 26 so that the materials cannot pass directly from the hopper into the conduit 27. The upward flow of air within the conduits 12 and 27 may be controlled by adjustable gates 28.

What is claimed is:

1. A dust extractor comprising, in combination, an upstanding drum having its lower end open, means for forcing air into said lower end and upwardly through the drum, feed means for delivering materials to be treated into the upper part of said drum so that the heavier particles will pass downwardly through the rising air currents, and means for delivering jets of air into the drum through its side walls at different points longitudinally of the drum and in a direction to impart a whirling movement to the materials within the drum.

2. A dust extractor comprising, in combination, an upstanding drum having an open lower end and means for producing a flow of air upwardly therethrough, a feed hopper for delivering the materials to be treated into said drum at the upper portion thereof to subject them to the rising air currents, and means for delivering jets of air inwardly through the wall of the drum at different points lengthwise of the drum and in a direction to impart a whirling movement to the materials within the drum.

3. A dust extractor comprising, in combination, an upstanding drum having means at its lower end for producing a flow of air upwardly through the drum, means for delivering the materials to be treated into the upper portion of the drum to subject them to the action of the air rising in the drum, and means for directing air inwardly at different points through the vertical side wall of said drum to blow the lighter particles inwardly toward the center of the drum and to impart a whirling movement to the air in the drum.

4. A dust extractor comprising, in combination, an upstanding drum having means for producing a flow of air upwardly therethrough and having apertures formed in its side wall at different points lengthwise of the drum, means for delivering the materials to be treated into the upper part of the drum to subject them to the action of the air rising in the drum that the lighter particles may be carried upwardly by the air, and a jacket surrounding the drum and having means for forcing air therein to produce air jets directed into the drum through said apertures.

5. A dust extractor comprising, in combination, a drum having means for producing a flow of air upwardly therethrough, a hopper at the upper portion of the drum for delivering the materials to be treated into a path of the air rising within the drum and having a perforated material-supporting surface, and means for directing currents of air through the perforated surface and materials within the hopper to promote feeding of the materials from the hopper into the drum.

6. A dust extractor comprising, in combination, an upright drum having means for producing a flow of air upwardly therethrough and having apertures in a side wall of the drum and spaced lengthwise of the drum throughout a substantial portion of its length, means for delivering the materials to be treated into the drum at the upper portion thereof that they may be subjected to the air currents passing upwardly within the drum, and means for forcing air into the drum through said apertures thoroughly to subject the materials therein to the action of the air.

7. A dust extractor comprising, in combination, a vertical drum having means for forcing air into its lower end to produce a flow of air upwardly therethrough and having apertures formed within the wall of the drum around the same and at intervals lengthwise thereof, means for delivering materials to be treated into the upper part of the drum so that the heavier particles will move downwardly through the rising air currents, lips adjacent said apertures to direct air passing therethrough about the interior of the drum with a whirling movement thoroughly to subject the materials therein to the action of the air, and means for forcing air inwardly through said apertures.

8. A dust extractor comprising, in combination, an upstanding drum having means for producing a flow of air upwardly within the drum throughout its length and having apertures formed in the side wall of the drum at intervals along the same, feed means for delivering materials to be treated into the upper portion of the drum so that the heavier particles will pass downwardly through the rising air currents, a jacket surrounding the drum, and means for forcing air tangentially into the jacket to whirl therein and escape through said apertures.

In testimony whereof, I have signed my name to this specification.

ALBERT H. STEBBINS.